Dec. 17, 1968  J. P. LOCKE  3,416,371
FLOW METER WITH ELECTRICAL READ-OUT
Filed April 7, 1966
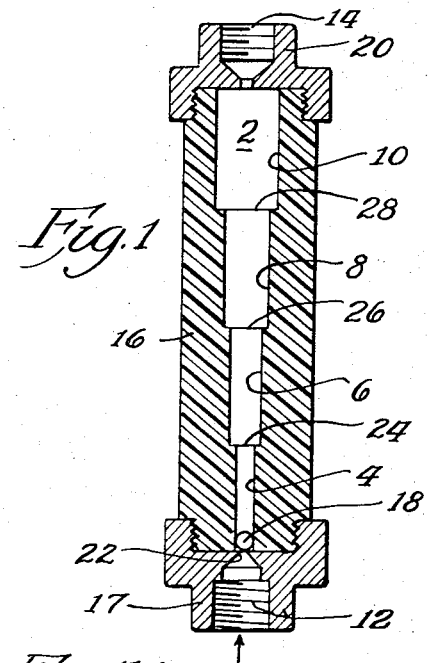
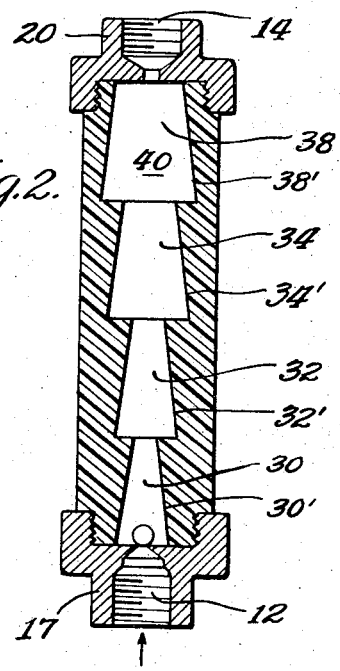
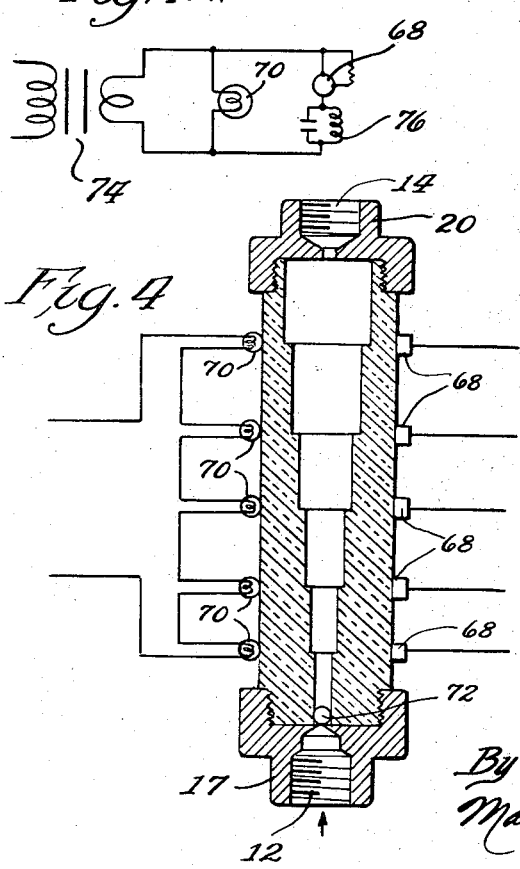
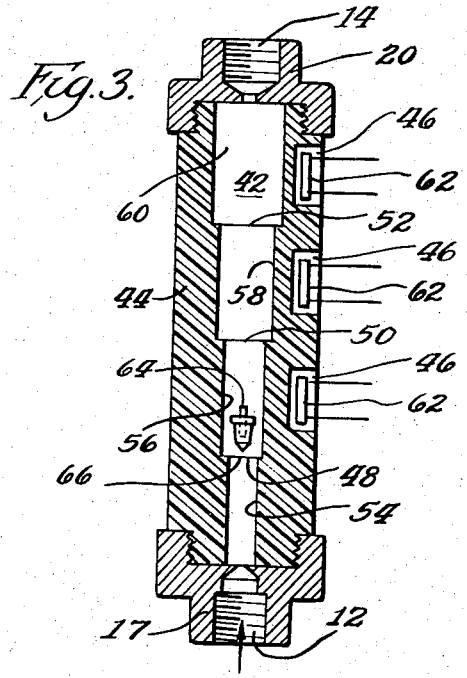
Inventor
John P. Locke
By
Mann, Brown & McWilliams.
Attys.

United States Patent Office 3,416,371
Patented Dec. 17, 1968

3,416,371
FLOW METER WITH ELECTRICAL READ-OUT
John P. Locke, Michigan City, Ind., assignor to F. W. Dwyer Mfg. Co., a corporation of Illinois
Filed Apr. 7, 1966, Ser. No. 540,947
3 Claims. (Cl. 73—209)

ABSTRACT OF THE DISCLOSURE

A float type flow meter in which a freely suspended body is placed in a vertical passageway having in excess of two adjacent end to end bores, each succeeding bore in the direction toward the outlet being of greater cross-sectional area than the preceding bore, and the outlet end of each bore having a cross-section no larger than its inlet end whereby snap action of the freely suspended body is obtained upon the change in rate of flow of fluid through the gauge. Means are provided along the gauge to indicate the position of the freely suspended body and thereby either indicate or register the rate of flow.

---

This invention relates to flow indicators and more particularly to a flow meter which is so fabricated that the rates of flow in which system the flow meter is incorporated is easily and accurately determined. More specifically, the invention relates to a float-type flow meter wherein the float takes specific positions within the flow passage of the flow meter in order to indicate flow rate.

One of the main difficulties in the prior art flow meters has been that the indicating means or float within the flow meter has, because of fluctuations in flow, been unable to designate a particular flow rate which is easily ascertainable either visually or with, for example, a finite number of indicating or read-out means. That is to say, because of the fluctuations involved, the float has bobbed within the flow passage of the flow meter which instability has made it difficult to determine flow rates without providing a multiplicity of expensive electrical or other flow rate indicating means.

It is therefore an object of this invention to provide a flow meter of the float-gauge type wherein the float takes a definite position within the flow passage of the flow meter.

Another object of this invention is to provide a flow meter which may indicate specific calibrated rates of flow visually and/or electrically.

It is a still further object of this invention to provide a flow meter having an inlet end and an outlet end wherein a float is disposed within a vertical passageway and rises in the passageway as fluid flow increases, wherein the vertical passageway in which the float rises has a stepped configuration defining a plurality of end to end bores increasing in cross-section from the inlet end to the outlet end of the flow meter whereby the float during fluid flow assumes a positive position at the point of increasing bore cross-section correlative to the magnitude of the fluid flow.

It is still a further object of the invention to provide a flow meter having a stepped design configuration in combination with electrical read-out means to provide indicia of fluid flow rate.

Still another object of the invention is to provide a flow meter wherein each of the end to end bores increasing in cross-section in a stepped design configuration has a slight reverse taper in order to facilitate the movement of the float therein.

It is still a further object of the invention to provide a flow meter which is simple in construction, can be made at relatively low cost using low cost material such as synthetics and to provide such a flow meter which is reliable and accurate in operation.

Additional objects and novel features of the invention will become apparent from the description which follows taken in conjunction with the accompanying drawings in which:

FIGURE 1 is a longitudinal section of a flow meter constructed in accordance with one embodiment of the invention;

FIGURE 2 is a longitudinal section of a flow indicator or meter constituting an alternative embodiment of this invention;

FIGURE 3 is a longitudinal section of a flow meter constructed in accordance with this invention in combination with an electrical flow rate indicia indicating apparatus;

FIGURE 4 is a schematic diagram showing a flow meter constructed in accordance with the herein disclosed invention in combination with a light sensitive flow rate indicating means; and FIGURE 4A is a simplified schematic diagram of an electrical circuit useful for the embodiment of FIGURE 4.

Referring specifically to FIGURE 1, a flow meter constructed in accordance with this invention is shown having a vertical passageway 2 of stepped configuration comprising a plurality of end to end bores 4, 6, 8 and 10 increasing in cross-sectional diameter from the inlet end of the flow meter 12 to the outlet end 14. While the plurality of bores may be separately fabricated it is preferred to make a unitary tube or conduit in which the plurality of end to end bores have been drilled, molded or machined. The conduit or tube 16 may be formed of a suitable transparent material such as plastic or the like, and where it is not desired to use a unitary tube, glass will suffice. Mounted on the inlet end 12 of the tube 16 is a fitting 17 and a similar fitting 20 on the outlet end 14 of the tube 16. Thus, the direction of flow is from 12 to 14 or in the direction of the arrow. As indicated earlier, each of the plurality of bores has a cross-sectional area greater than the preceding bore from the inlet end 12 to the outlet end 14. However, each of the bores in the embodiment illustrated has a constant cross-sectional area throughout its length. The uppermost portion of the inlet end 12 has a diameter slightly less than the float 18 so that the float 18 will not pass into the inlet opening 12. The float or ball 18 will, in accordance with this invention, move from its seat at 22 upwardly into the upper region of bore 4 as flow takes place and will move from the lower end of the bore 4 to the upper end to the step 24 for a predetermined flow rate. Once the flow rate increases the float 18 will immediately come to rest at the next larger bore or step at point 26. And similarly the float 18 will be retained at this point unless an increase or decrease of flow takes place. If the flow continues to increase, the float 18 will rather rapidly move up and come to rest at step 28. If the flow decreases the float 18 on the other hand, will come to rest at the next lower step, i.e. 26, 24 or 22. In prototypes of the flow indicators which have been tested it has been found that the float 18 has imparted thereto a snap-acting force upon increases in flow, moving the float 18 to various steps within the flow passageway of the flow meter coming to rest at the steps 24, 26 or 28 for each specific rate of flow. It is at once obvious to those of ordinary skill in the art that the passageway must contain a plurality of end to end bores of varying cross-section in order to provide a range of flow rates. While only four bores have been illustrated for sake of clarity it is at once apparent that the flow meter may comprise any number of bores in excess of two in order to provide some indicia over a large range of flow rates. It should be noted that the steps in the passageway formed by the plurality of end to end bores has been greatly exaggerated to illustrate the principles involved in the herein disclosed invention. The intended use of the novel flow meter will generally dictate the actual dimensions of the stepped flow passageway. Generally the diameter of the bores will vary by about two percent increments. Normally, for small scale applications the bores will change in cross-section diameter by about .002 inch. Merely for purposes of disclosure and not by way of limitation the first bore adjacent the inlet end 12 for instance, may have a diameter of about one-fourth inch or greater and the bores such as 6, 8 and 10 will have an increasingly larger diameter as heretofore indicated.

It will be noted that the step formed by any two bores in juxtaposition is rather abrupt or sharp. It has been found in tests that this sharp or abrupt transition in cross-sectional area enhances the movement of the float or ball 18 from the smaller passage or bore into the larger passage or bore. The float or ball 18 may be formed of any suitable material depending upon the sensing mechanism, if any, which is to be utilized. If visual observation is desired, as for the illustration indicated in FIGURE 1, a plastic ball may be preferred since it is economical and does not produce chatter and noise as would a metallic ball. When sufficient ambient light is available or by the placement of a light source adjacent to the transparent tube 16 where natural light is insufficient it will be possible to readily observe the position of the ball 18, and thus one may readily determine the amount of flow taking place through the flow meter. Where only visual means of determining flow rate is desired, it is preferable that the material from which the tube 16 is fashioned be of a transparent nature. In fashioning the tube 16, if it is to be of a unitary molded element, the diameter of the various bores will be correlative to previously determined flow rates for that particular diameter and float or ball. Suitable markings can then be placed adjacent each of the steps indicating the flow rate of the fluid passing through the flow meter.

Referring now to FIGURE 2 an alternate embodiment of the invention illustrated in FIGURE 1 is shown which is quite similar to the operation of the device depicted in FIGURE 1. The main distinction over the device of FIGURE 1 is that the plurality of bores 30, 32, 34 and 38, forming the fluid passageway 40, each having a varying cross-sectional diameter, or stated another way, have side walls 30′, 32′, 34′ and 38′ respectively with a reverse taper. With side walls of the reverse taper configuration the float or ball 18 will have a tendency to make the transition from the smaller diameter bore such as 30 to the larger diameter bore such as 32 in a shorter period of time, thus being more responsive to changes in flow, either of increasing magnitude or decreasing magnitude.

In FIGURE 3 there is illustrated a specific type of electrical indicating means which is not dependent upon visual operation. In this embodiment the outside wall 44 of the main fluid passageway 42 is provided with recesses 46 at each of the steps 48, 50 and 52 formed by the end to end bores 54, 56, 58 and 60 respectively. In each of the recesses 46 is disposed a dry reed switch 62. These switches, which are readily available commercially such as "Western Electric type 224A," are influenced by magnetic flux in order to complete a circuit. This switch is basically a glass tube slightly under ¼ inch in diameter into which are placed two magnetic-material members. The Western Electric type G-29, or equivalent, is a smaller version ⅛ inch in diameter by ¾ inch long. The magnetic members are long slender flattened reeds, fused into the ends of the glass tube in cantilever fashion so that their extreme ends aligned and overlap, but with an airgap of about 0.01 inch. When this assembly is brought into the influence of a magnetic field, the reeds, being ferromagnetic, become a flux-carrying portion of the magnetic circuit. The extreme ends of the reeds will assume opposite magnetic polarity, and if sufficient flux is present the attraction forces overcome the stiffness of the reeds and they flex toward each other and touch. With suitable plating or contact material, switch action is obtained. When using indicating means of this nature it will be necessary to provide a magnet 64 within the float or ball 66 so that when the float rises or descends in the fluid passageway 42 of the flow meter, the presence of the magnetic flux will cause a switch to close and thus register the position of the float and hence indicate the flow rate of the fluid passing through the flow meter. Conversely, the switch will open when the magnetic field is no longer present. In this embodiment the tube need not be transparent although it is important that the tube materials and fittings be of a nonmagnetic character so as not to interfere with the magnetic properties of the magnet inserted in the float or bob 66.

In FIGURE 4 there is illustrated a different type of electrical read-out system using light sensitive switches 68 stationed at each one of the steps with corresponding light sources 70 furnished opposite each of the light-sensitive switches 68. Thus, it is preferable that the float in this embodiment be of an opaque or light-blocking character so that the passage of the float 72 will interrupt the light falling on the light sensitive switches, thus opening the switches and indicating the fluid flow rate. A switch 68 and the schematic drawing connected therewith depicted in FIGURE 4A is one which is known in the art but which circuitry has not been used in a stepped flow design flow meter. The power source 74, the light source 70, and light sensitive switch 68 coact to actuate relay 76 to activate a visual or audible registering means not shown.

An indicator constructed in accordance with any of the embodiments of this invention may be fabricated readily and economically. It is pointed out that any of the fittings described may be formed by casting although the same may be formed by machining if desired. Any of the transparent tubes when made of plastic may be individually molded or may be formed from sections of extruded tubing cut to length, with threads machined therein when necessary.

While several specific examples have been given of electrical indicating means, those of ordinary skill in the art will at once recognize that there are other methods of determining the position of the ball or float at the various steps formed by the end to end bores and systems contemplated are those based on either inductive sensing coils placed opposite the steps which react with a metallic float or a capacitance type sensing device which will act to indicate the position of the float. These various embodiments are considered to merely involve engineering skill and will not be dealt with herein inasmuch as the various means of indicating the position of the float and the electrical circuitry connected therewith merely involve ordinary engineering skill. Although certain variations and changes have been indicated it will be understood that other variations and changes may be made and that the invention may be embodied in forms other than those described, all without departing from the spirit and scope thereof.

The embodiments of the invention in which a specific property or privilege is claimed is defined as follows:

1. In a flow meter of the float-gauge type having a vertical passageway with an inlet at the bottom and an outlet at the top end and a float in said passageway designed to assume different vertical positions with change in rate of flow through said meter, the improvement which comprises a conduit having a passageway of stepped configuration defining in excess of two adjacent end-to-end bores, each of said bores having a gradually decreasing cross-section from its inlet to its outlet end, said passageway increasing in cross-section from said inlet to said outlet and a float in said passageway adapted to move rapidly upwardly therein from one bore to the next succeeding bore upon predetermined change in rate of flow, whereby change in rate of flow from a predetermined minimum rate to succeeding predetermined rates can be determined.

2. A flow meter in accordance with claim 1 in which the cross-sectional areas of the inlet and outlet ends of each bore are respectively greater than those of the bore immediately adjacent in the direction of the inlet to said passageway.

3. A flow meter in accordance with claim 2 including separate means adjacent each bore for determining the position of said float in said passageway.

References Cited

UNITED STATES PATENTS

| 2,827,008 | 3/1958 | Hodge | 73—207 X |
| 3,224,270 | 12/1965 | Karol et al. | 73—209 |
| 3,332,283 | 7/1967 | Michalowicz | 73—219 |

FOREIGN PATENTS

| 604,113 | 8/1927 | Germany. |
| 1,081,009 | 6/1954 | France. |
| 138,357 | 2/1903 | Germany. |

RICHARD C. QUEISSER, *Primary Examiner.*

EDWARD D. GILHOOLY, *Assistant Examiner.*